United States Patent
Skoretz et al.

(10) Patent No.: US 9,248,981 B1
(45) Date of Patent: Feb. 2, 2016

(54) STEERABLE WHEEL DIVERTERS

(71) Applicant: Amazon Technologies, Inc., Reno, NV (US)

(72) Inventors: Dallas Wayne Skoretz, McDonald, TN (US); Jefferson Benjamin Thompson, IV, Ooltewah, TN (US); Paul Lincoln McCurley, Rockvale, TN (US)

(73) Assignee: Amazon Technologies, Inc., Reno, NV (US)

( * ) Notice: Subject to any disclaimer, the term of this patent is extended or adjusted under 35 U.S.C. 154(b) by 60 days.

(21) Appl. No.: 14/298,062

(22) Filed: Jun. 6, 2014

(51) Int. Cl.
*B65G 13/10* (2006.01)
*B65G 47/64* (2006.01)
*B65G 13/07* (2006.01)
*B65G 43/00* (2006.01)

(52) U.S. Cl.
CPC .............. *B65G 47/648* (2013.01); *B65G 13/07* (2013.01); *B65G 13/10* (2013.01); *B65G 43/00* (2013.01)

(58) Field of Classification Search
CPC ...................................................... B65G 13/10
See application file for complete search history.

(56) References Cited

U.S. PATENT DOCUMENTS

| | | | | |
|---|---|---|---|---|
| 5,086,906 A | * | 2/1992 | Ludke | B65G 13/10 198/369.5 |
| 5,551,543 A | * | 9/1996 | Mattingly | B65G 13/10 198/370.01 |
| 7,040,478 B2 | * | 5/2006 | Ehlert | B65G 13/10 198/369.4 |
| 7,581,632 B2 | * | 9/2009 | Wallace | B65G 47/54 198/370.08 |
| 8,561,790 B2 | * | 10/2013 | Brayman | B65G 13/071 198/370.01 |

* cited by examiner

*Primary Examiner* — Gene Crawford
*Assistant Examiner* — Thomas Randazzo
(74) *Attorney, Agent, or Firm* — Athorus, PLLC

(57) ABSTRACT

A steerable wheel diverter system having a plurality of diverter wheels pivotally mounted at least partially within a common assembly and a powered roller mounted external to the common assembly may be provided in series with an ingress conveying apparatus and one or more egress conveying apparatuses. Providing the powered roller outside of the common assembly enables maintenance evaluations on the powered roller, or on a motor associated with the powered roller, to be performed quickly and easily, and without having to disassemble the common assembly.

20 Claims, 9 Drawing Sheets

STEERABLE WHEEL DIVERTERS

BACKGROUND

Conveyor systems are mechanical systems for transporting large objects or materials from one location to another. Such systems may be employed in a variety of throughput applications. For example, conveyor belts are regularly used for translating suitcases, bags or other luggage through airports, for moving parts or components along an assembly line, or for transferring items or packages through a shipping facility. Typically, a conveyor system includes one or more movers for conveying objects in a single dimension or direction, such as a conveyor belt, e.g., a system of two or more pulleys or pulley-like wheels causing motion of a continuous loop band, as well as one or more machines or features for changing a direction of travel of objects being conveyed, as well as for moving objects from one conveyor to another, or for transferring objects into a bin, chute or other like apparatus. Such machines or features are sometimes called "diverters," "divert mechanisms," or, simply, "diverts."

Various types of diverters are used to modify the directions of travel of objects within a conveyor system. One common divert is a steerable wheel divert, which may be provided in series with a branch or branches of a conveyor system, and includes one or more rows of commonly aligned and motorized rotating wheels. When objects are being conveyed through the conveying system, one or more rows of the rotating wheels rotate in a manner consistent with a primary direction of travel, i.e., about an axis perpendicular to the primary direction of travel, and thereby cause objects passing over the wheels to travel in a straight line through the conveyor. When an object is to be diverted from the conveying system, however, one or more control signals may be transmitted to a control system associated with the steerable wheel divert, thereby causing each of the wheels within a row to pivot in common by a defined angular extent, and increase in rotational velocity, thereby causing the rotating wheels to rotate in a manner that points away from the primary direction of travel, and toward a secondary direction of travel, according to the defined angular extent. In this regard, a steerable wheel diverter may be provided in a manner that causes objects passing over such wheels to be diverted from the conveying system into a predetermined chute or a nearby bin, cart or storage vessel, or from one branch of the conveying system into another branch of the conveying system.

Steerable wheel diverters typically include a common assembly having one or more motors, e.g., induction motors, which power one or more roller devices, each of which may cause a row of wheels to rotate at a predetermined or adjustable rate of rotation, and in directions that may be defined by one or more control signals. Upon a receipt of one or more of such signals, an actuator may cause the respective wheels in the row to pivot about the axes of rotation of by a predefined amount, e.g., nominal angles such as thirty (30°) degrees, forty-five (45°) degrees or the like. The actuator may operate in any manner, e.g., through the use of any type of device, such as pneumatic, hydraulic, electrical or mechanical devices. Steerable wheel diverters are provided in series between conveying devices, such as conveyor belts, that are typically mounted at elevated heights in order to permit a conveying system to include chutes or other components that rely on gravity as an energy source. A steerable wheel diverter may thus act as a junction between various segments of a conveying system, and cause items arriving via ingress to be routed to one or more points of egress.

When a steerable wheel diverter requires maintenance, however, the operation of a conveying system may be adversely impacted for extended periods of time. An entire branch of a conveying system that includes a steerable wheel diverter must be taken offline in order to repair or replace one or more of the wheels or rows of wheels, or to otherwise perform maintenance on or replace one or more of the motors, actuators, or other critical parts. Because the components of a conveying system are often large and unwieldy, and may be provided in elevated locations or in locations where access is limited, maintenance to a single steerable wheel diverter may shut down a branch of such a conveying system, or the entire conveying system, for extended periods of time.

DETAILED DESCRIPTION

As is set forth in greater detail below, the present disclosure is directed to conveying systems including steerable wheel diverters having prime movers that are provided outside of a common assembly which includes one or more rollers and rows of wheels. Specifically, the systems and methods of the present disclosure are directed to steerable wheel diverters having powerless rollers mounted within a common assembly that are connected to rows of pivotable wheels that are aligned to permit objects to pass thereover, as well as powered rollers that are located outside the common assembly and are connected to the powerless rollers in order to cause such rollers, and the wheels to which such rollers are connected, to rotate at a given rate. By providing the powered rollers outside of the common assembly which houses the powerless rollers that are connected to the rows of wheels, the systems and methods disclosed herein may enable maintenance or replacement evaluations to be performed more quickly, efficiently and safely, as compared to prior art systems and methods including powered rollers provided within the common assembly.

Figure 1A:
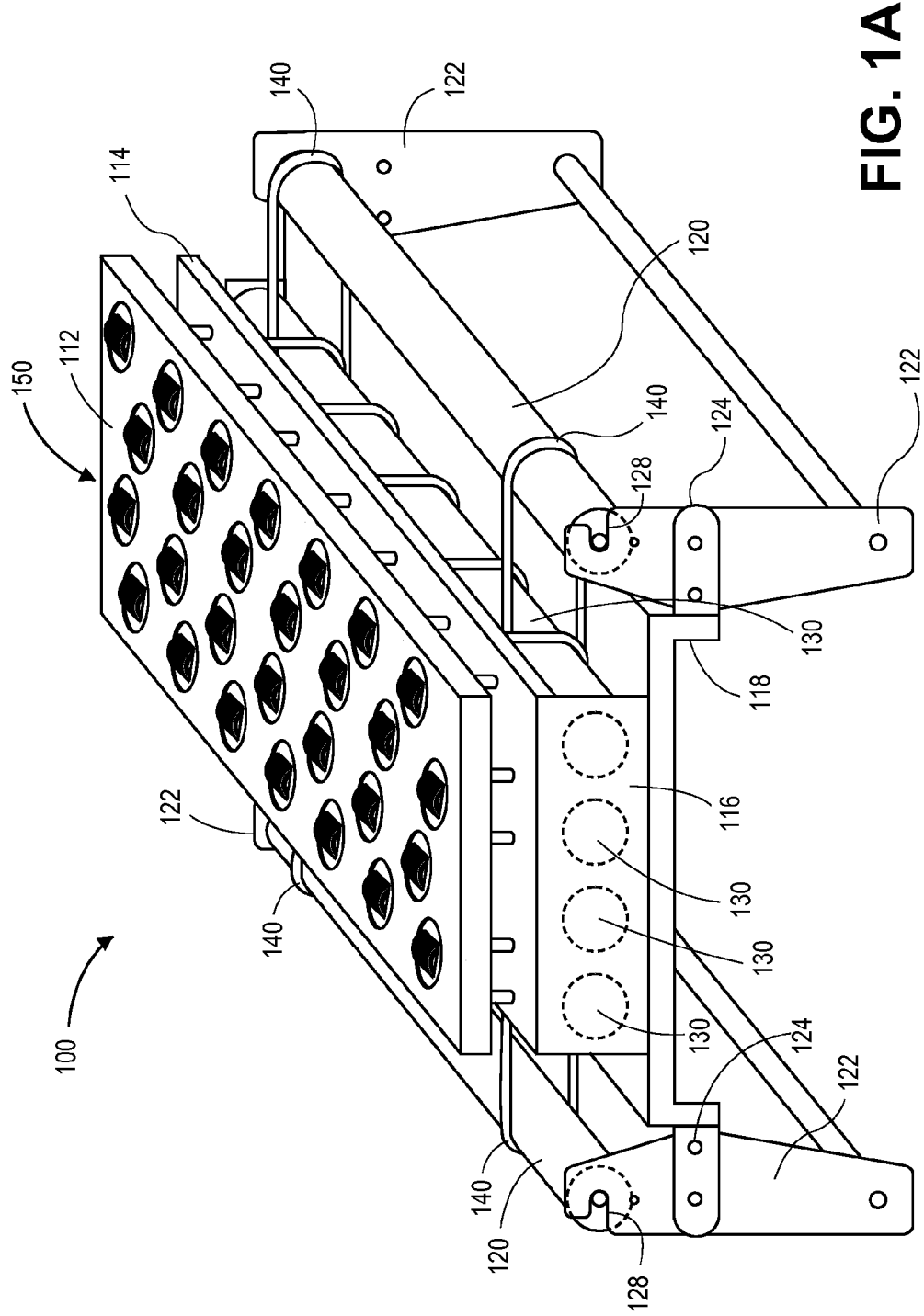
FIGS. 1A, 1B and 1C show components of one embodiment of a steerable wheel diverter in accordance with embodiments of the present disclosure.
Figure 1B:
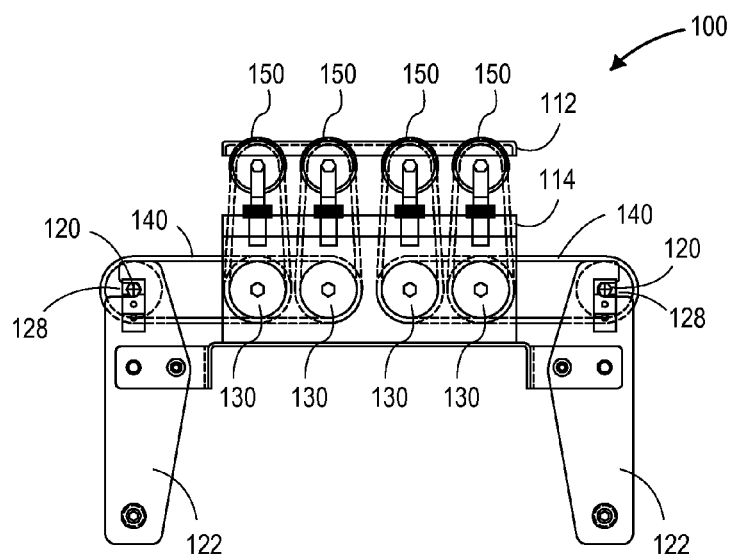
Figure 1C:
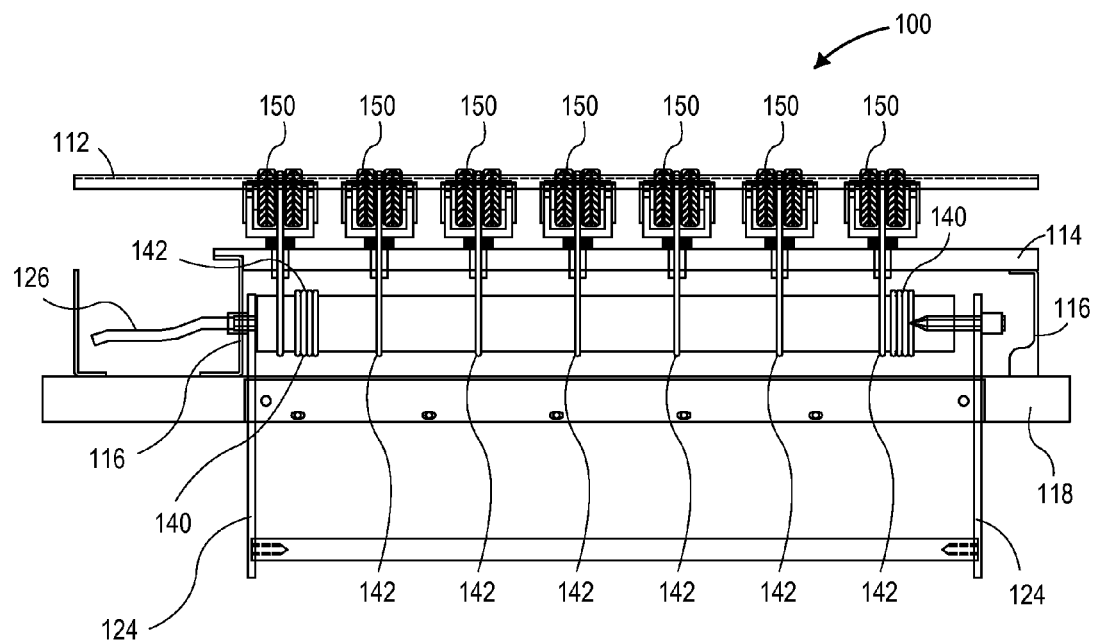

Referring to FIGS. 1A, 1B and 1C, a steerable wheel diverter 100 is shown. As is shown in FIG. 1A, the steerable wheel diverter 100 includes a common assembly 110 and two motorized rollers 120. The common assembly 110 of FIG. 1A is formed from a cover plate 112 having a plurality of holes with portions of diverter wheels 150 extending therethrough, as well as a mounting assembly 114 for the diverter wheels 150, a side plate 116 and a base 118. The common assembly 110 further includes four non-motorized rollers 130 that are mounted to the side plate 116. The motorized rollers 120 are provided on brackets 122 that are mounted to supports 124 provided on either side of the common assembly 110.

The motorized rollers 120 are connected to the non-motorized rollers 130 by way of bands 140, which are aligned approximately horizontally and are provided at regular intervals along a length of the motorized rollers 120. As is shown in FIG. 1A, each of the motorized rollers 120 is mounted outside of the common assembly 110, and is connected to one of the non-motorized rollers 130 inside of the common assembly 110 by way of a pair of bands 140. In this manner, a rotation of a motorized roller 120 causes a concomitant rotation of a non-motorized roller 130 to which the motorized roller 120 is connected by way of the bands 140. Moreover, two of the brackets 122 include notches 128 which permit the motorized rollers 120 to be easily removed from the brackets 122 when tension is removed from the bands 140, e.g., when the brackets 122 and the motorized rollers mounted thereon may be rotated in a direction toward the common assembly 110 during maintenance or repairs.

As is shown in FIG. 1B, each of the diverter wheels 150 is connected to one of the non-motorized rollers 130 by way of a band 142, which is aligned approximately vertically. Additionally, the non-motorized rollers 130 may also be connected to one another by way of bands 144, which are also aligned approximately horizontally and are provided at regular intervals along a length of the non-motorized rollers 130.

Thus, despite being mounted outside of the common assembly 110, the motorized rollers 120 may cause rotations of each of the non-motorized rollers 130 located inside of the common assembly 110, by way of the bands 140 and the bands 144, and further cause rotations of each of the diverter wheels 150, by way of the bands 142. Moreover, because the motorized rollers 120 are provided outside of the common assembly 110, any maintenance associated with the proper operation of the motorized rollers, including but not limited to removing grease or dirt buildup on the motorized rollers or any of their windings, determining an operating temperature of the motors, evaluating or replacing winding insulation, verifying resistances and connectivity of the windings, confirming phase balances, checking bearings, or any other like evaluations or exercises, as well as replacing the motorized rollers 120, may be performed without having to remove the steerable wheel diverter 100 from service or open the common assembly 110.

In this regard, the systems and methods of the present disclosure enable conveying systems which include one or more of the steerable wheel diverters disclosed herein to remain online and in operation for longer durations of time, while minimizing the amount of time required in order to repair or replace critical components thereof.

A diverter is typically provided in series with one or more conveying apparatuses of a conveyor system, in order to change a direction of travel of one or more objects within the conveyor system, or to cause such objects to travel in an intended direction toward a desired destination. A diverter may be used to direct an object from one conveying apparatus (e.g., an ingress conveyor) to another conveying apparatus (e.g., an egress conveyor), or to remove or otherwise extricate an object from a conveyor system entirely, such as to another device or component associated with the conveying system such as a bin, a chute, a cart or a truck.

Steerable wheel diverters are commonly provided in conveying systems. A steerable wheel diverter includes a plurality of wheels that are aligned in one or more rows and preferably rotate in common directions (e.g., about the same axis or parallel axes) and/or at common velocities. During standard operations, the direction of rotation of the wheels is typically straight, or aligned with a longitudinal axis of an egress conveyor, such that an item traveling across the steerable wheel diverter from a first conveyor (e.g., an ingress conveyor) is directed to a second conveyor (e.g., an egress conveyor). Where it is desired to cause the item to travel to a third conveyor, or to another device or component of the conveying system, however, the wheels of one or more rows may be caused to temporarily pivot about an axis, thereby reorienting the direction of rotation away from the longitudinal axis of the second conveyor and toward the third conveyor or the other device or component, and, optionally, changing the rate of rotation. Thus, a velocity of an item traveling across the steerable wheel changes according to the direction and/or rate of rotation of the wheels, and the item is transferred to a new conveyor, or to a nearby bin, chute, cart or truck, or other device or component of the conveying system.

The pivoting of the wheels of one or more rows from a non-diverting alignment or orientation, e.g., where the rotating wheels are aligned to cause an item to travel in a first direction, to a diverting alignment, e.g., where the rotating wheels are aligned to cause the item to travel in a second direction, may be caused by any form of prime mover. For example, a row of wheels may be pivoted by way of a pneumatic force applied to a mechanical linkage to frames of wheels in the row, thereby causing each of the wheels in the row to temporarily pivot by a common angular extent before being returned to an original position upon a removal of the pneumatic force. Alternatively, the row of wheels may be pivoted by a rack-and-pinion system, in which a selective linear motion of a drive gear or rack which contacts pinions mounted to the frames of the wheels and causes the frames to pivot by a common angular extent, and in which the frames may be returned to an original position when the drive gear or rack returns to an original position.

The rotation of the wheels of one or more rows of a steerable wheel diverter is caused by one or more rollers provided in a common assembly or housing, wherein each of the wheels has a banded connection with one of the rollers. Typically, a motorized roller, which may sometimes be called a power roller, a master roller or a drive roller, may be provided in the common assembly and powered by an electric motor, such as an induction motor, and be connected to a plurality of wheels in a row by way of a plurality of bands or O-rings. In such a configuration, the rotation of the roller causes a concomitant rotation of each of the wheels in the row to which the roller is connected. Additionally, the common assembly or housing may further include one or more non-motorized rollers, which may sometimes be called idler rollers or slave rollers, which also have banded connections with at least one motorized roller. In this regard, a single power roller provided in a common assembly may cause rotations of not only the wheels but also the other rollers to which the power roller is connected by one or more bands or O-rings.

Providing the pivoting and rotating components of a steerable wheel diverter in a common assembly enables the steerable wheel diverter to be provided in series with two or more conveying apparatuses of a conveying system. In some embodiments, a conveying system may include a plurality of conveying apparatuses provided at elevated heights within a fulfillment center or like facility, thereby enabling the conveying system to include one or more conveying apparatuses such as chutes or slides, which operate by utilizing gravitational potential energy. For example, the components of a conveying system may be provided within a fulfillment center or like facility at ground level, or at heights of two feet to fifty feet (2 ft to 50 ft) above a working surface of the fulfillment center, with elevated heights of approximately twelve feet (12 ft) being common. Therefore, a common assembly of a steerable wheel diverter may be mounted at one or more of the elevated heights of the conveying system, and may cause items to travel thereon within the conveying system from one conveying apparatus to another conveying apparatus, or to depart the conveying system altogether.

The compact nature of a common assembly of a steerable wheel diverter, however, also provides one or more limitations. For example, when the steerable wheel diverter requires maintenance or repair, the entire common assembly may require detachment and disassembly in order to inspect, diagnose and cure any mechanical, electrical or other defects that may be plaguing the conveying system as a whole, or the steerable wheel diverter in particular. Because a steerable wheel diverter may weigh dozens or hundreds of pounds, and may be mounted aloft at elevated heights, such evaluations may require multiple personnel and large, durable lift equipment, and may require taking the conveying systems offline for extended periods.

The systems and methods of the present disclosure are directed to providing a steerable wheel diverter with one or more motorized rollers that are positioned outside of a common assembly that includes one or more non-motorized rollers and one or more rows or diverter wheels, as well as actuators or other components for operating the steerable wheel diverter as a component part of a conveying system. In this regard, faults with one or more components of motorized rollers or motors may be repaired and replaced quickly, thereby reducing the time required in order to perform repairs or replacements from hours to minutes.

The motorized rollers of the present disclosure may be powered by any type or form of motor. Preferably, a motorized roller is powered by an induction motor, which features a rotor placed within a stator, such that the rotor and the stator are separated from one another by an air gap that permits the rotor to rotate freely therein. The rotor and the stator are formed of yokes having windings embedded or lodged within predefined slots therein, which are referred to as poles. An application of an alternating current (or "AC") signal to the stator windings creates a rotating magnetic flux in the stator, i.e., a stator flux. Despite the lack of contact between the stator and the rotor, the stator flux thereby generates a voltage potential in each of the rotor windings according to Faraday's Law. Because the rotor windings are in the presence of the magnetic field generated by the stator flux, the rotor windings are subjected to a mechanical force, which is sometimes called a Lorentz Force, which causes the rotor to rotate along with the rotating magnetic stator flux.

In a three-phase AC motor, stator windings are usually circumferentially separated by 120 degrees (120°), or $2\pi/3$ radians, about the stator. The application of three-phase AC to the stator windings will thus generate three separate fluxes that combine to create a magnetic field that rotates at the same frequency as the AC applied to the stator windings. A synchronous speed of an induction motor is therefore defined by the equation $N_S = 120 \cdot f/P$, where $N_S$ is the synchronous speed of the motor, f is the frequency of the AC applied to stator, and P is the number of stator poles. The operating speed of an induction motor usually never reaches the synchronous speed, and instead differs from the synchronous speed by a phenomenon known as slip. Thus, an operational speed of a rotor in an induction motor is typically a function of frequency of current applied to a stator. Moreover, induction motors are easy to operate and control, at least because they are subjected to reduced wear-and-tear based on the non-contacting nature of the stator and the rotor.

The steerable wheel diverters of the present disclosure may be formed from any suitable materials, as well. For example, the bands connecting motorized rollers outside of a common assembly to non-motorized rollers within the common assembly, such as the bands 140 of FIGS. 1A-1C, and the bands connecting non-motorized rollers to the diverter wheels, such as the bands 142 of FIGS. 1A-1C, may take the form of rubber O-rings having diameters of approximately five millimeters (5 mm). Moreover, the rollers may also be formed of any suitable material and have any dimension, such as stainless or galvanized steel rollers having diameters of approximately fifty millimeters (50 mm). The plates, brackets and structural components of the steerable wheel diverters, such as the cover plate 112, the mounting assembly 114, the side plate 116, the brackets 122 or the supports 124 of FIGS. 1A-1C, may be formed from any sufficiently durable materials, such as stainless or galvanized steel.

Additionally, the components of the steerable wheel diverters may be sized, as necessary, in order to properly correlate with other components (e.g., conveyor belts, chutes or other like features) within the conveying system. For example, the steerable wheel diverters may have a width of approximately forty inches (40"), and a length of approximately fourteen inches (14"). Likewise, the actuators for causing the various rows of diverter wheels to pivot about their respective axes may also take any form. For example, the actuators may be triggered upon signals received from one or more computer components, such as a programmable logic computer, and may cause the diverter wheels to pivot in response to a pneumatic force. The actuators may further include a rack-and-pinion arrangement in which each of the frames supporting the diverter wheels includes a gear or pinion fixed about at least a portion of a shaft that contacts a linear gear or rack, where each of the various pinions rotates in response to a linear movement of the rack.

Moreover, the motorized rollers and the non-motorized rollers may be geographically aligned in any spatial arrangement. For example, referring again to FIGS. 1A-1C, the motorized rollers 120 and the non-motorized rollers 130 may be aligned in a common plane and connected to one another by bands 140, which are also aligned in parallel. Alternatively, the motorized rollers and the non-motorized rollers may be aligned in varying planes, e.g., where the motorized rollers are provided beneath the non-motorized rollers. Further, any number of motorized rollers may be provided with respect to the non-motorized rollers. For example, as is shown in FIGS. 1A-1C, a single motorized roller may be provided for the purpose of driving two non-motorized rollers, or in any other ratio with regard to a number of non-motorized rollers. The distances between the various non-motorized rollers within a common assembly may be equal to the distance between one of the non-motorized rollers and a motorized roller that provides a rotational force thereto.

Figure 2A:
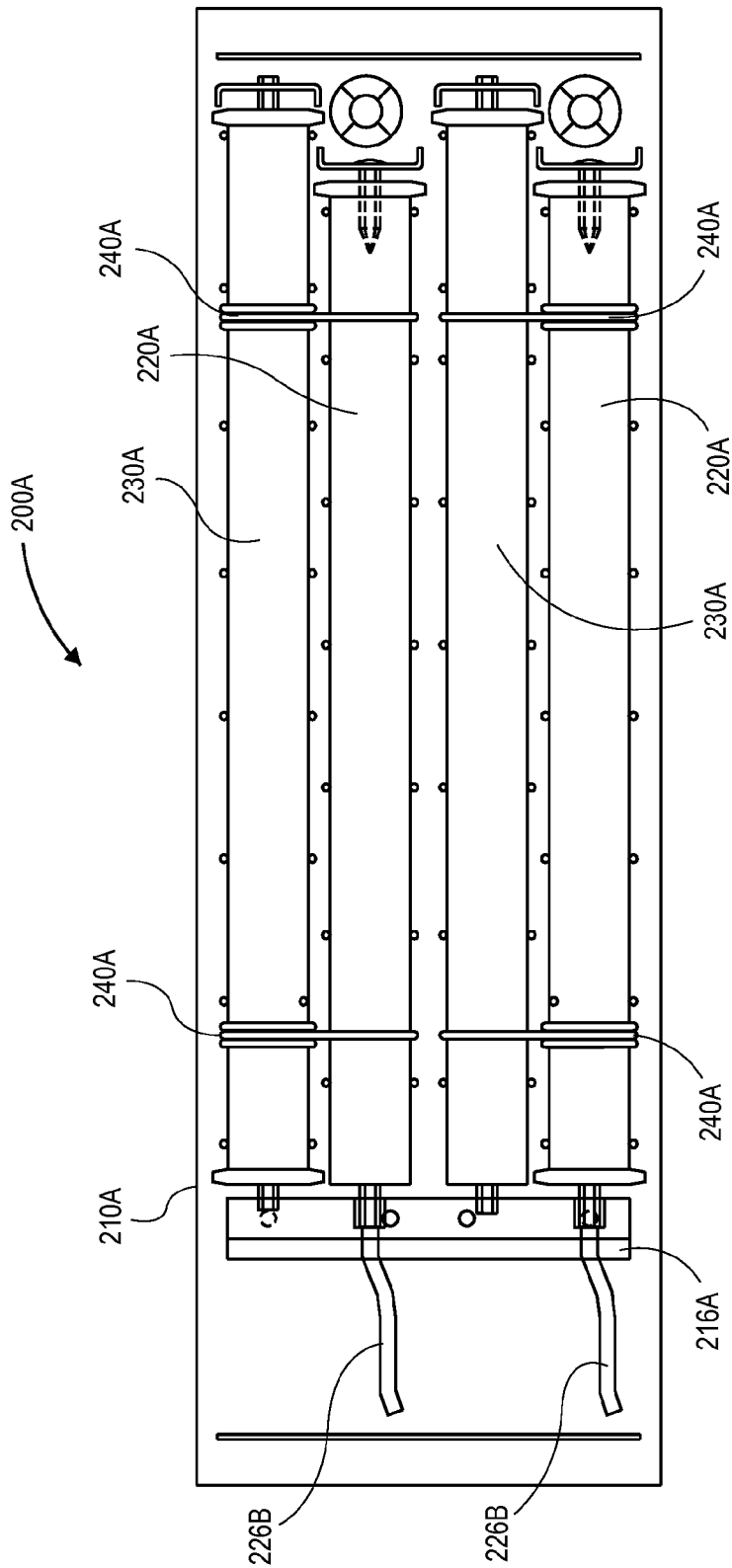
FIG. 2A shows components of a prior art steerable wheel diverter.
Figure 2B:
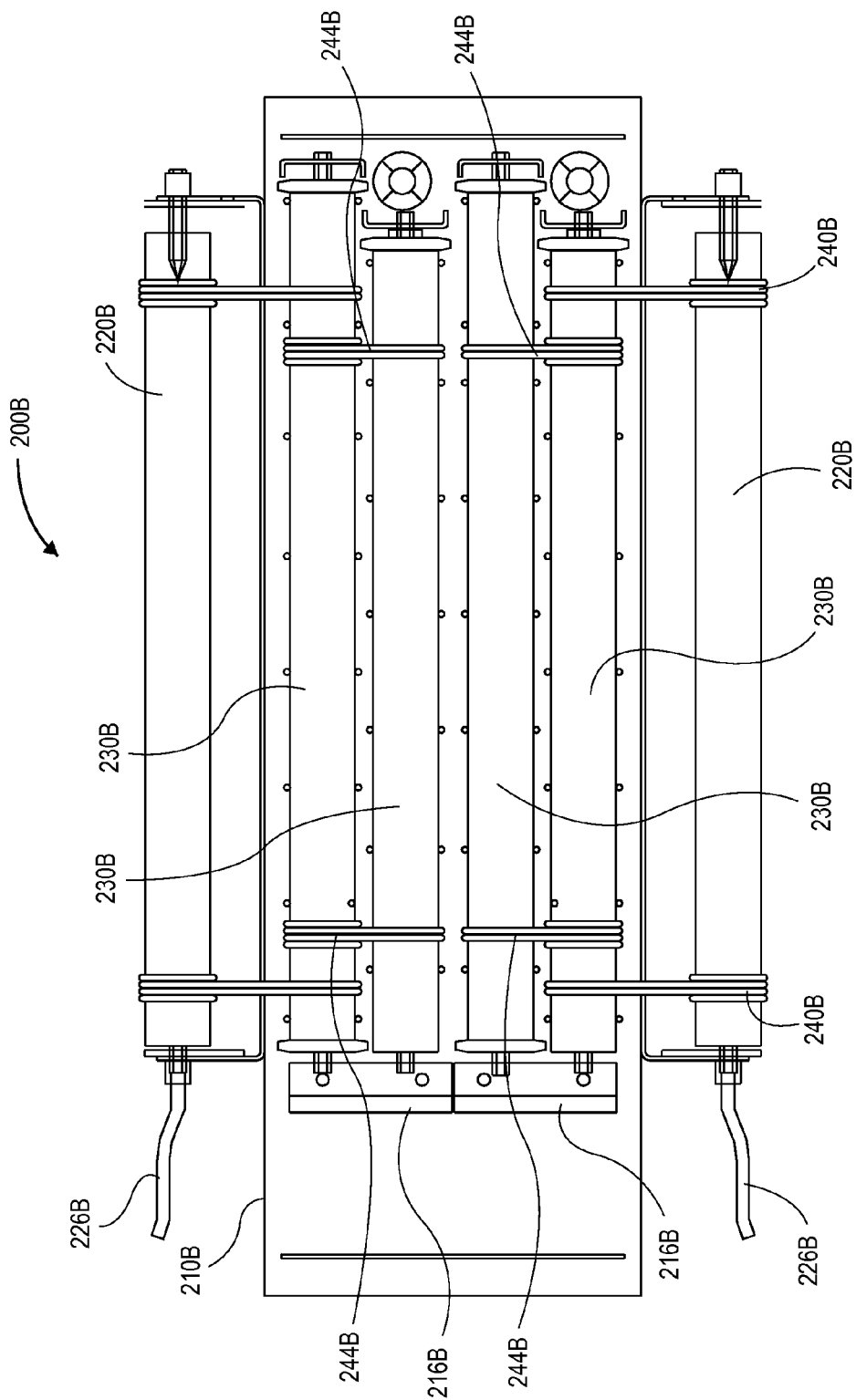
FIG. 2B shows components of one embodiment of a steerable wheel diverter in accordance with embodiments of the present disclosure.

One distinction between the steerable wheel diverters of the present disclosure, and the steerable wheel diverters of the prior art, may be shown with regard to FIGS. 2A and 2B. Referring to FIG. 2A, a top view of components of a steerable wheel diverter 200A of the prior art is shown. Except where otherwise noted, reference numerals preceded by the number "2" in FIG. 2A or 2B indicate components or features that are similar to components or features having reference numerals preceded by the number "1" shown in FIGS. 1A-1C.

The steerable wheel diverter 200A includes a common assembly or housing 210A including two motorized rollers or drive rollers 220A and two non-motorized or idler rollers 230A that are mounted to a side plate 216A. Each of the idler rollers 230A in the steerable wheel diverter 200A of FIG. 2A is connected to one of the drive rollers 230A within the common assembly 230A by bands 240A. Additionally, each of the drive rollers 230A receives power from an external power source (not shown) by way of a powered connector 226A.

As is shown in FIG. 2A, prior art steerable wheel diverters, such as the steerable wheel diverter 200A, include motorized rollers and non-motorized rollers, such as the drive rollers 220A and the idler rollers 230A, within the same housing, such as the common assembly 210A. Therefore, where components of such motorized rollers require preventive maintenance, corrective maintenance or replacement, the operation of the conveying system in which the steerable wheel diverters are provided must be interrupted, and the common assembly 210A must be opened and accessed in order to inspect, repair or replace any such components, as necessary.

The steerable wheel diverters of the present disclosure, however, include motorized rollers that are provided outside of a common assembly in which the non-motorized rollers are provided. Referring to FIG. 2B, a steerable wheel diverter 200B of the present disclosure is shown. As is shown in FIG. 2B, the steerable wheel diverter 200B includes two drive rollers 220B that are mounted outside of a common assembly 210B, and are connected to a corresponding idler roller 230B that is mounted inside of the common assembly 210B by way of one or more bands 240B. Additionally each of the four idler rollers 230B within the common assembly 210B is either connected directly to one of the drive rollers 220B by way of the bands 240B, or is connected to another idler roller 230B by way of one or more bands 244B. In turn, the steerable wheel diverter 200B may further include rows of diverter wheels (not shown), with each of the rows connected to one of the idler rollers 230B by one or more bands (not shown). Additionally, each of the drive rollers 230B receives power from an external power source (not shown) by way of a powered connector 226B.

Moreover, as is shown in FIG. 2B, the four idler rollers 230B are aligned in pairs within the common assembly 210B, with each of the pairs of idler rollers 230B connected to a side plate 216B, and with each of the drive rollers 220B aligned to cause rotations of the idler rollers 230B in one of the pairs. Thus, by providing split side plates 216B, as is shown in FIG. 2B, when maintenance or repairs may be required to one of the drive rollers 220B, or to one of the idler rollers 230B of one of the pairs, the maintenance or repairs need not affect the entire steerable wheel diverter 200B, and may instead be focused solely on the driver rollers 220B or the idler rollers 230B which specifically require attention.

Accordingly, the systems and methods of the present disclosure enable a steerable wheel diverter to provide rotational energy to diverter wheels using motorized rollers that are mounted outside of a common assembly, such as the drive rollers 220B of FIG. 2B, to cause rotations of non-motorized rollers that are mounted inside of the common assembly, such as the idler rollers 230B of FIG. 2B, which are in turn connected to rows of rotatable diverter wheels by one or more bands. Therefore, the wheels of the steerable wheel diverters of the present disclosure, such as the steerable wheel diverter 200B of FIG. 2B, may be caused to rotate in one or more directions while enabling maintenance to the motors to be performed more quickly and efficiently, as compared to steerable wheel diverters of the prior art, such as the steerable wheel diverter 200A of FIG. 2A.

Figure 3:
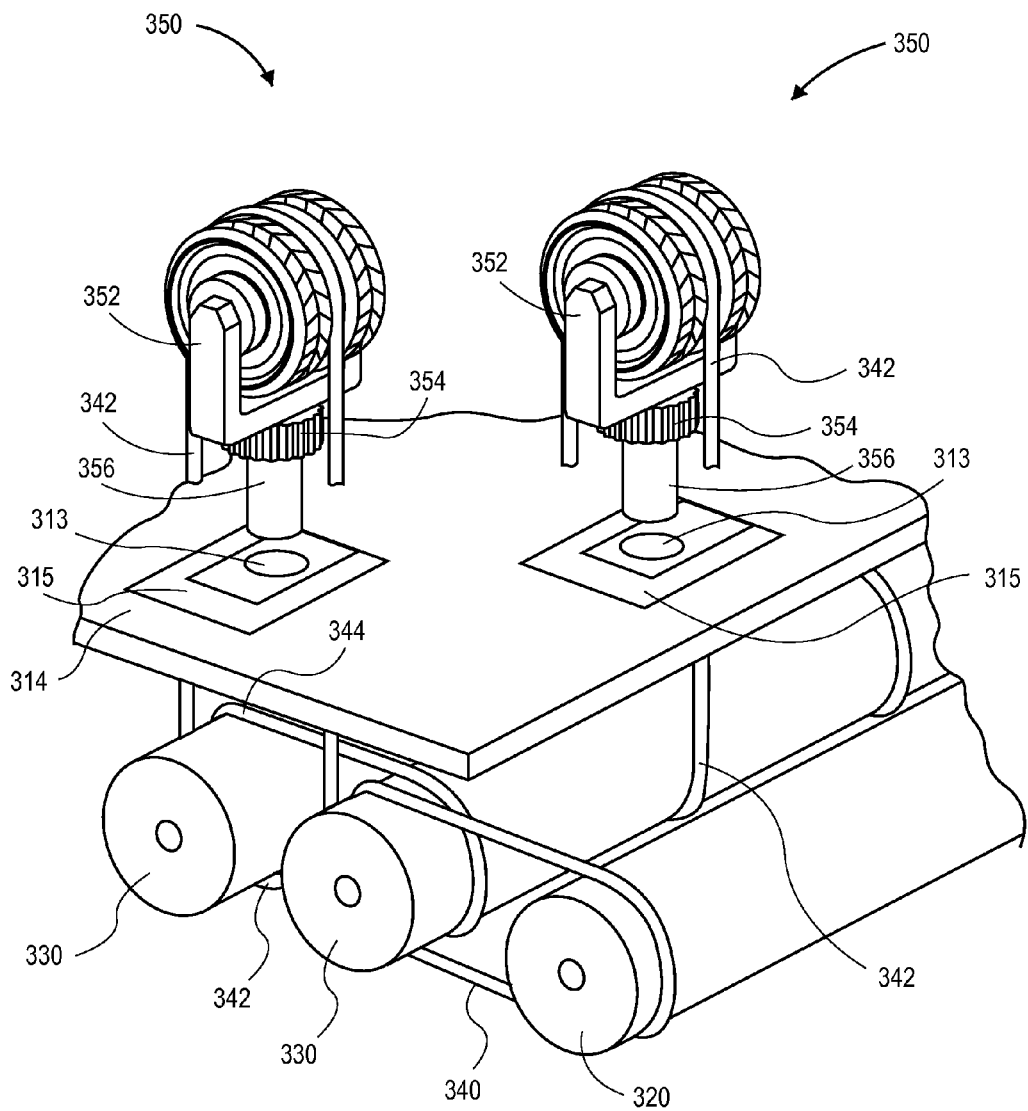
FIG. 3 shows components of one embodiment of a steerable wheel diverter in accordance with embodiments of the present disclosure.

The interconnectedness of the various motorized rollers, non-motorized rollers and diverter wheels of the present disclosure may be shown with regard to FIG. 3. Referring to FIG. 3, components of one embodiment of a steerable wheel diverter 300 in accordance with embodiments of the present disclosure are shown. Except where otherwise noted, reference numerals preceded by the number "3" in FIG. 3 indicate components or features that are similar to components or features having reference numerals preceded by the number "2" in FIG. 2A or 2B, or the number "1" shown in FIGS. 1A-1C.

As is shown in FIG. 3, the diverter 300 includes a common assembly 310 having a mounting assembly 314, a pair of diverter wheels 350 and two non-motorized rollers 330, as well as a motorized roller 320 provided outside of the common assembly 310. Each of the diverter wheels 350 includes a frame 352 having a pinion 354 mounted to a shaft 356 which may be inserted into a support hole 313 provided in the mounting assembly 314, thereby providing a pivotable support for the frame 352 and the diverter wheel 350. The diverter wheels 350 are shown in a staggered arrangement, e.g., at different latitudinal alignments within the mounting assembly 314 across the width of the common assembly 310, consistent with the arrangement of the diverter wheels 150 of the steerable wheel diverter 150 shown in FIG. 1A. The staggered arrangement of the diverter wheels 350 enables the diverter 300 to provide a larger number of contact points for items passing across the diverter 300, and thereby increases the extent of influence that may be imparted on such items by the diverter wheels 350.

As is also shown in FIG. 3, the motorized roller 320 is connected to one non-motorized roller 330 located inside of the common assembly 310 by way of a band 340. In turn, the non-motorized roller 330 that is connected to the motorized roller 320 is further connected to a non-motorized roller 330 by way of a band 344. Additionally, each of the diverter wheels 350 is connected to one of the non-motorized rollers 330 by way of a band 342 extending through a band passageway 315.

Therefore, the systems and methods of the present disclosure enable steerable wheel diverters, such as the steerable wheel diverter 300 of FIG. 3, to provide one or more rows of rotating wheels that are connected to non-motorized rollers within a common assembly by one or more banded connections and powered by motorized rollers mounted outside of the common assembly.

As is discussed above, the rows of diverter wheels of the steerable wheel diverters of the present disclosure may be pivoted together such that the directions of rotations of each of the diverter wheels in the rows may be modified in concert. In this regard, the diverter wheels may rotate in a first direction associated with a first conveying apparatus (e.g., an egress conveyor belt) before being pivoted to a second direction associated with a second conveying apparatus (e.g., another egress conveyor belt, a chute, a bin or a cart) when it is desired to cause an object passing over the diverter wheels to travel in the second direction and toward the second conveying apparatus.

Figure 4:
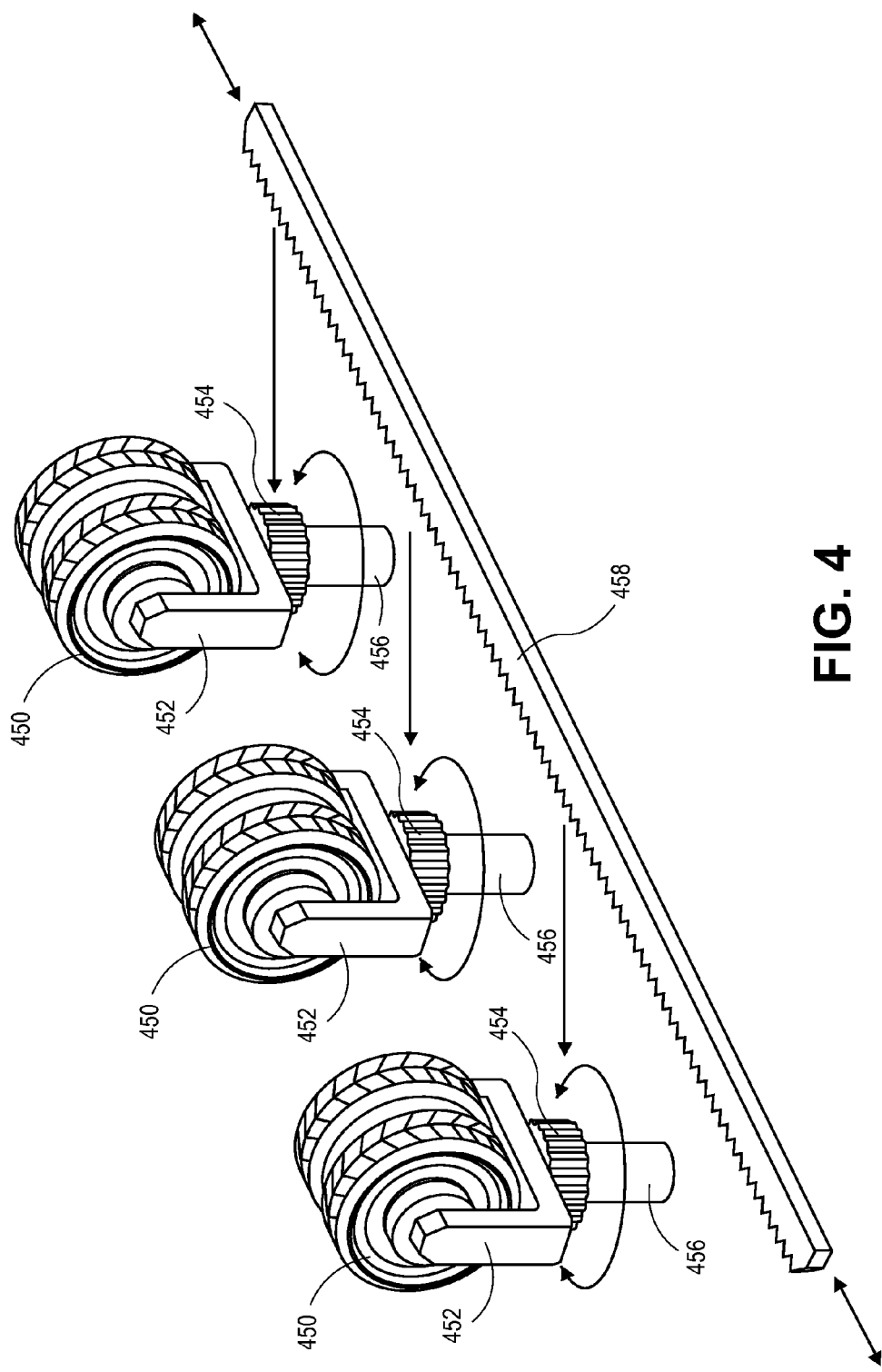
FIG. 4 shows components of one embodiment of a steerable wheel diverter in accordance with embodiments of the present disclosure.

The diverter wheels may be pivoted together by any mechanism. Referring to FIG. 4, components of one embodiment of a steerable wheel diverter 400 in accordance with embodiments of the present disclosure are shown. Except where otherwise noted, reference numerals preceded by the number "4" in FIG. 4 indicate components or features that are similar to components or features having reference numerals preceded by the number "3" in FIG. 3, by the number "2" in FIG. 2A or 2B, or the number "1" shown in FIGS. 1A-1C.

As is shown in FIG. 4, the steerable wheel diverter 400 includes three diverter wheels 450 aligned in a common line. Each of the diverter wheels 450 includes a frame 452 having a pinion 454 mounted on a shaft 456. Additionally, the steerable wheel diverter 400 further includes a linear gear 458 having teeth aligned along a line. When the linear gear 458 is mated to the pinions 454 of the diverter wheels 450, a linear motion of the linear gear 458 will cause each of the diverter wheels 450 to pivot to a common extent, e.g., an angular amount that is consistent for each of the diverter wheels 450. Accordingly, a direction of rotation of each of the diverter wheels 450 in a row may be modified by controlling the position of the linear gear 458, e.g., by applying a force to the linear gear 458 that causes the linear gear 458 to travel in one of two directions. Such a force may be applied electromechanically, pneumatically, hydraulically or in any other manner in accordance with the present disclosure.

Figure 5A:
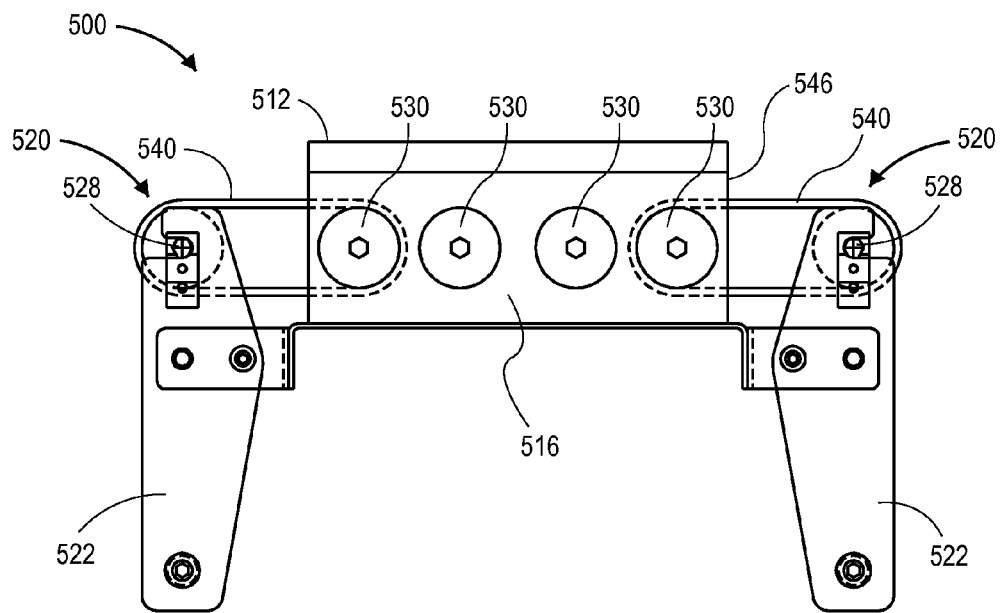
FIGS. 5A and 5B show components of one embodiment of a steerable wheel diverter in accordance with embodiments of the present disclosure.
Figure 5B:
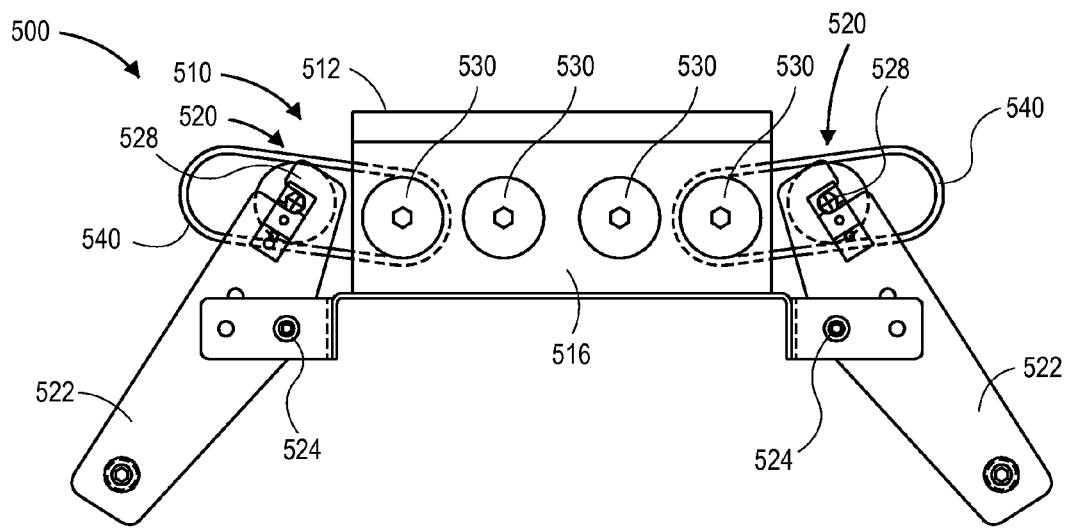

Additionally, the motorized rollers may be mounted or otherwise provided in association with a common assembly which houses non-motorized rollers and other components in any manner. For example, the motorized rollers may be mounted in a bracketed arrangement with quick-release connections that enable the motorized rollers to be installed on or removed from the common assembly as quickly and efficiently as possible. Referring to FIGS. 5A and 5B, components of one embodiment of a steerable wheel diverter 500 in accordance with embodiments of the present disclosure are shown. Except where otherwise noted, reference numerals preceded by the number "5" in FIGS. 5A and 5B indicate components or features that are similar to components or features having reference numerals preceded by the number "4" in FIG. 4, by the number "3" in FIG. 3, by the number "2" in FIG. 2A or 2B, or the number "1" shown in FIGS. 1A-1C.

Referring to FIG. 5A, the steerable wheel diverter 500 includes a common assembly 510 and a pair of motorized rollers or drive rollers 520 provided outside of the common assembly 510, e.g., mounted to brackets 522 with quick-release connections 526 to supports 524. The common assembly 510 further includes a cover plate 512 and a side plate 516, along with four non-motorized or idler rollers 530 therein. As is shown in FIG. 5A, each of the drive rollers 520 is connected to one of the idler rollers 530 by way of bands 540, and the axes of rotation of the drive rollers 520 and the idler rollers 530 are aligned in a common plane.

In accordance with the present disclosure, the quick-release connections 526 enable the drive rollers 520 to be replaced quickly and efficiently, without having to open the common assembly 510. Referring to FIG. 5B, the steerable wheel diverter 500 is shown with the quick-release connections 526 having been opened, and the brackets 524 rotated inward toward the common assembly 510, thereby relieving the tension in the bands 540. Therefore, where the brackets 522 are provided at a sufficient distance from the common assembly, and with a quick-release connection 526, the brackets 522 may permit either of the drive rollers 520 to be removed by way of the notches 528 and replaced without opening the common assembly 510.

Figure 6:
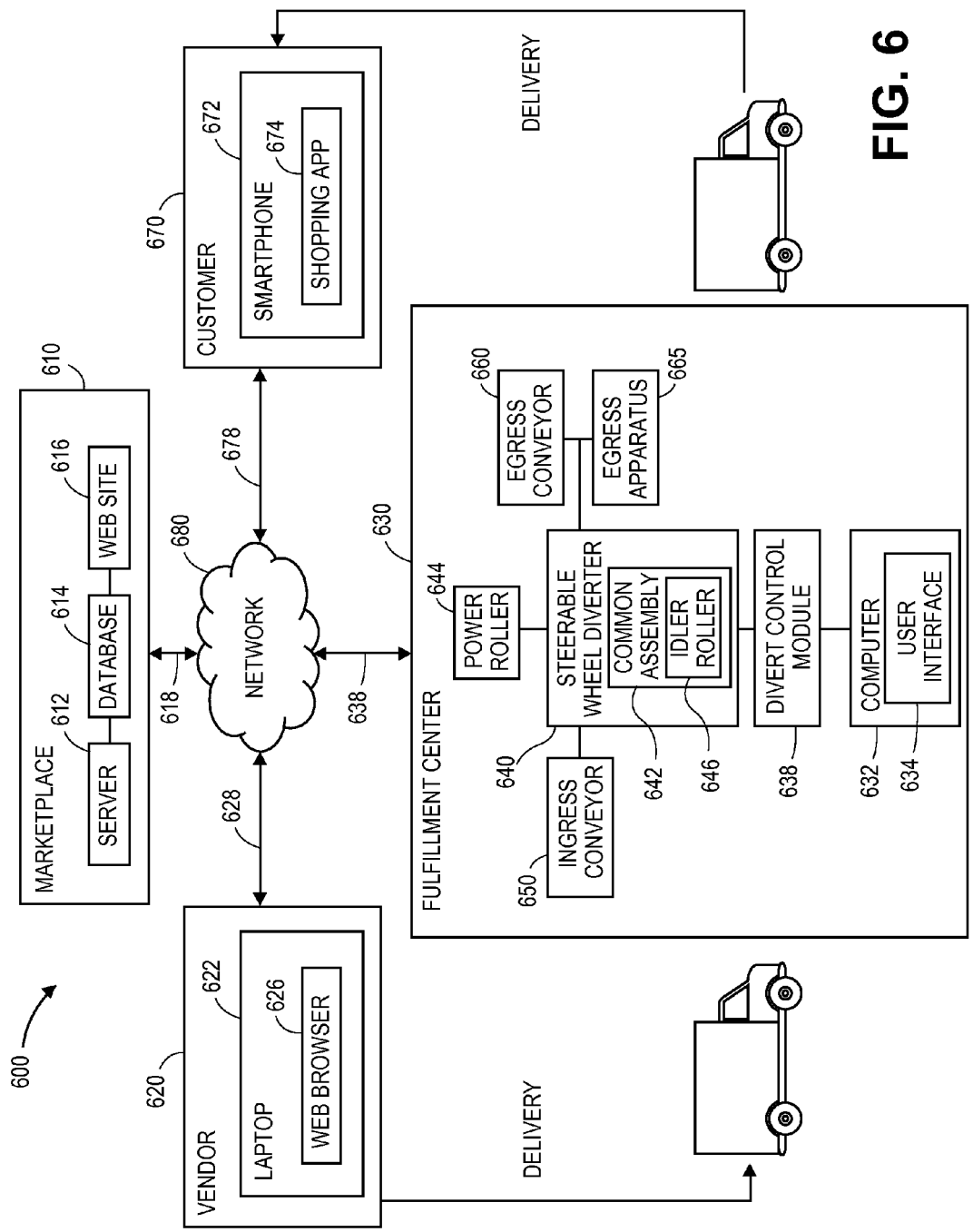
FIG. 6 shows a block diagram of one embodiment of a system including a steerable wheel diverter in accordance with embodiments of the present disclosure.

The steerable wheel diverters of the present disclosure may be provided in any environment or facility in which a conveying system is utilized, including but not limited to a fulfillment center, a storage or distribution facility, a warehouse or another like structure. Referring to FIG. 6, a block diagram of components of one system 600 including a steerable wheel diverter in a fulfillment center environment is shown. The system 600 includes a marketplace 610, a vendor 620, a fulfillment center 630 and a customer 670 that are connected to one another across a network 680, such as the Internet.

The marketplace 610 may be any entity or individual that wishes to make items from a variety of sources available for download, purchase, rent, lease or borrowing by customers using a networked computer infrastructure, including one or more physical computer servers 612 and databases (or other data stores) 614 for hosting a network site, such as a web site 616. The marketplace 610 may be physically or virtually associated with one or more storage or distribution facilities, such as the fulfillment center 630. The web site 616 may be implemented using the one or more servers 612, which are connected to or may otherwise communicate with the one or more databases 614 as well as other computer components by way of the network 680, as indicated by line 618, through the sending and receiving of digital data. Moreover, the database 614 may include information of any type regarding items that have been made available for sale through the marketplace 610, or ordered by customers from the marketplace 610. The database 614 may further include any information of any type regarding items that are delivered to the fulfillment center 630, stored at the fulfillment center, or shipped to other destinations from the fulfillment center 630.

The vendor 620 may be any entity or individual that wishes to make one or more items available to customers, such as the customer 670, by way of the marketplace 610. The vendor 620 may operate one or more order processing and/or communication systems using a computing device such as a laptop computer 622 and/or software applications such as a browser 626, which may be implemented through one or more computing machines that may be connected to the network 680, as is indicated by line 628, in order to transmit or receive information regarding one or more items to be made available at the marketplace 610, in the form of digital or analog data, or for any other purpose.

The vendor 620 may deliver one or more items to one or more designated facilities maintained by or on behalf of the marketplace 610, such as the fulfillment center 630. Additionally, the vendor 620 may receive one or more items from other vendors, manufacturers or sellers (not shown), and may deliver one or more of such items to locations designated by the marketplace 610, such as the fulfillment center 630, for fulfillment and distribution to customers. Furthermore, the vendor 620 may perform multiple functions. For example, the vendor 620 may also be a manufacturer and/or a seller of one or more other items, and may offer items for purchase at venues (not shown) other than the marketplace 610 by customers (not shown) other than the customer 670. Additionally, items that are made available at the marketplace 610 or ordered therefrom by customers may be made by or obtained from one or more third party sources, other than the vendor 620, or from any other source (not shown). Moreover, the marketplace 610 itself may be a vendor, a seller or a manufacturer.

The fulfillment center 630 may be any facility that is adapted to receive, store, process and/or distribute items. As is shown in FIG. 6, the fulfillment center 630 includes a networked computer infrastructure for performing various computer-related functions associated with the receipt, storage, processing and distribution of such items, including one or more computers 632, which may generate and/or render one or more user interfaces 634. The fulfillment center 630 may also include stations for receiving, storing and distributing items to customers, such as one or more receiving stations, storage areas and distribution stations.

As is shown in FIG. 6, the fulfillment center 630 also includes a steerable wheel diverter 640 that is provided in series with one or more ingress conveyors 650 as well as one or more egress conveyors 660 and/or egress apparatuses 665.

The steerable wheel diverter 640 includes a common assembly 642, at least one power roller (or motorized roller, or drive roller) 644 and at least one idler roller (or non-motorized roller, or slave roller) 646. As is shown in FIG. 6, in accordance with the present disclosure, the idler roller 646 is provided inside the common assembly 642, along with any other actuators, diverter wheels (e.g., which may be arranged in rows) or other components or elements that may be required in order to cause such diverter wheels to rotate at a given speed or angular velocity, or pivot to a given direction, while the power roller 644 is provided outside of the common assembly 642.

Additionally, the steerable wheel diverter 640 further includes a divert control module 648, which may be a software application or hardware component connected to or otherwise associated with one or more computer devices, and may generate or receive signals for controlling the operations of one or more elements of the steerable wheel diverter 640. For example, as is shown in FIG. 6, the divert control module 648 may be connected to the computer 632, which may be or include a programmable logic computer, and may receive instructions or signals from the computer 632 for causing one or more rows of wheels within the common assembly 642 to rotate at a predetermined speed, or for causing such rows of wheels to pivot at a predetermined angle. Alternatively, the divert control module 648 may generate such instructions or signals independently, e.g., upon recognizing an item or a type of item traveling along one or more of the ingress conveyors 650, or receive such instructions or signals from one or more external computers over the network 680.

As is discussed above, the power roller 644 may be aligned to rotate freely about a given axis, and may include one or more motors or motorized prime movers for causing a rotation of the power roller 644 at a predetermined speed or angular velocity. Additionally, during operation, and as is also discussed above, the idler roller 646 may also be aligned to rotate freely about a given axis, and may be functionally linked to or joined with the power roller 644 by one or more bands, e.g., one or more of the bands 140 of FIGS. 1A-1C, or one or more of the bands 340 of FIG. 3. Thus, the power roller 644 may receive one or more instructions or signals from the divert control module 648, and rotate at a given speed or angular velocity in response to such instructions, thereby causing the idler roller 646 to also rotate at the given speed or angular velocity of the power roller 644, or at a similar speed or angular velocity. As is further discussed above, the idler roller 646 may be functionally linked to or joined with one or more diverter wheels (not shown) by one or more bands, e.g., one or more of the bands 142 of FIGS. 1A-1C, or one or more of the bands 342 of FIG. 3, which may be aligned in one or more rows, and the rotation of the idler roller 646 may cause such diverter wheels to rotate at the given speed or angular velocity of the power roller 644, or at a similar speed or angular velocity. Additionally, where the common assembly 642 includes two or more idler rollers 646, such idler rollers 646 may be functionally linked to or joined with one another by one or more bands, e.g., one or more of the bands 144 of FIGS. 1A-1C, or one or more of the bands 344 of FIG. 3, which may cause such rollers 646 to rotate at the given speed or angular velocity of a power roller to which one of the idler rollers 646 is connected, or at a similar speed or angular velocity.

The ingress conveyors 650 and the egress conveyors 660 may comprise one or more powered or powerless conveying systems that are provided for transporting objects, items or materials of varying sizes and shapes, and include any number of machines or elements for causing the motion or translation of such objects, items or materials from one location to another. Any form of mover, including but not limited to belts, chains, screws, tracks or rollers, may drive such machines or elements and the objects, items or materials may be transported within such conveying systems in a container or carrier, or on or within the mover itself. Such machines or elements may further include one or more pulleys, shafts, hubs, bushings, sprockets, bearings and other elements for causing a movement of a conveyor. Further, a conveying system may convey objects, items or materials into one or more static or dynamic conveying apparatuses, such as the egress apparatus 665, which may include one or more machines or elements such as a bin, a chute, a cart, a truck or another like apparatus.

One machine or element commonly found in conveying systems is a conveyor belt, which may include a banded continuous-loop belt (e.g., rubber or fabric) that is placed into motion by a series of two or more pulleys, at least one of which is driven by a motor. Objects, items or materials may be placed directly onto the belt, or into one or more bins or like containers that may be placed on the belt. Similarly, a chain conveyor may carry one or more pendants, which may be used to pull unit loads on pallets or in other large-scale containers. Conveying systems may also include a gravity conveyor, which may consist of a series of rollers that may be used to move objects based on a difference in height, and a resulting difference in gravitational potential energy, without the use of a motor, by way of chutes, tracks, ramps or other like components. Additionally, the conveying systems of the present disclosure may further include one or more other diverter systems, in addition to the steerable wheel diverter systems (not shown), such as a pusher divert, for transferring objects from one conveying system or conveying apparatus to another conveying system or conveying apparatus.

The fulfillment center 630 may further operate one or more order processing and/or communication systems using computer devices such as the computer 632, or through one or more other computing devices or machines that may be connected to the network 680, as is indicated by line 638, in order to transmit or receive information in the form of digital or analog data, or for any other purpose. Such computer devices may also operate or provide access to one or more reporting systems for receiving or displaying information or data regarding workflow operations, and may provide one or more interfaces for receiving interactions (e.g., text, numeric entries or selections) from one or more operators, users or workers in response to such information or data. Such computer devices may be general purpose devices or machines, or dedicated devices or machines that feature any form of input and/or output peripherals such as scanners, readers, keyboards, keypads, touchscreens or like devices, and may further operate or provide access to one or more engines for analyzing the information or data regarding the workflow operations, or the interactions received from the one or more operators, users or workers.

Additionally, as is discussed above, the fulfillment center 630 may include one or more receiving stations featuring any apparatuses that may be required in order to receive shipments of items at the fulfillment center 630 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage or distribution to customers. The fulfillment center 630 may also include one or more predefined two-dimensional or three-dimensional storage areas including facilities for accommodating items and/or containers of such items, such as aisles, rows, bays, shelves, slots, bins, racks, tiers, bars, hooks, cubbies or other like storage means, or any other appropriate regions or stations. The fulfillment center 630 may further include one or more distribution stations where items that have been retrieved from a designated storage area may be evaluated, prepared and packed for delivery from the fulfillment center 630 to addresses, locations or destinations specified by customers, also by way of carriers such as cars, trucks, trailers, freight cars, container ships or cargo aircraft (e.g., manned aircraft or unmanned aircraft, such as drones).

The customer 670 may be any entity or individual that wishes to download, purchase, rent, lease, borrow or otherwise obtain items (e.g., goods, products, services or information of any type or form) from the marketplace 610. The customer 670 may utilize one or more computing devices, such as a smartphone 672 or any other like machine that may operate or access one or more software applications, such as a web browser (not shown) or a shopping application 674, and may be connected to or otherwise communicate with the marketplace 610, the vendor 620 or the fulfillment center 630 through the network 680, as indicated by line 678, by the transmission and receipt of digital data. Moreover, the customer 670 may also receive deliveries or shipments of one or items from facilities maintained by or on behalf of the marketplace 610, such as the fulfillment center 630, or from the vendor 620.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Those of ordinary skill in the pertinent arts will understand that process steps described herein as being performed by a "marketplace," a "vendor," a "fulfillment center," a "divert control module," or a "customer," or like terms, may be automated steps performed by their respective computer systems, or implemented within software modules (or computer programs) executed by one or more general purpose computers. Moreover, process steps described as being performed by a "marketplace," a "vendor," a "fulfillment center," a "divert control module," or a "customer" may be typically performed by a human operator, but could, alternatively, be performed by an automated agent.

The marketplace 610, the vendor 620, the fulfillment center 630 and/or the customer 670 may use any web-enabled or Internet applications or features, or any other client-server applications or features including E-mail or other messaging techniques, to connect to the network 680 or to communicate with one another, such as through short or multimedia messaging service (SMS or MMS) text messages. For example, the computer 632 may be adapted to transmit information or data in the form of synchronous or asynchronous messages that may be generated or displayed by way of the user interface 634 from the fulfillment center 630 to the server 612, the laptop computer 622, the smartphone 672 or any other computer device in real time or in near-real time, or in one or more offline processes, via the network 680. Those of ordinary skill in the pertinent art would recognize that the marketplace 610, the vendor 620, the fulfillment center 630 or the customer 670 may operate any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the server 612, the laptop computer 622, the computer 632, or the smartphone 672, or any other computers or control systems utilized by the marketplace 610, the vendor 620, the fulfillment center 630 or the customer 670 and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Although some of the embodiments disclosed herein reference the use of steerable wheel diverters in connection with conveying systems provided in a fulfillment center environment, the systems and methods are not so limited. Rather, the systems and methods disclosed herein may be utilized in any environment in which a conveying system or like system is provided, and in which the capacity to divert an object in one or more predetermined directions is desired. Such systems and methods are particularly useful in environments objects must be conveyed in high volumes or at relatively high speeds.

Figure 7:
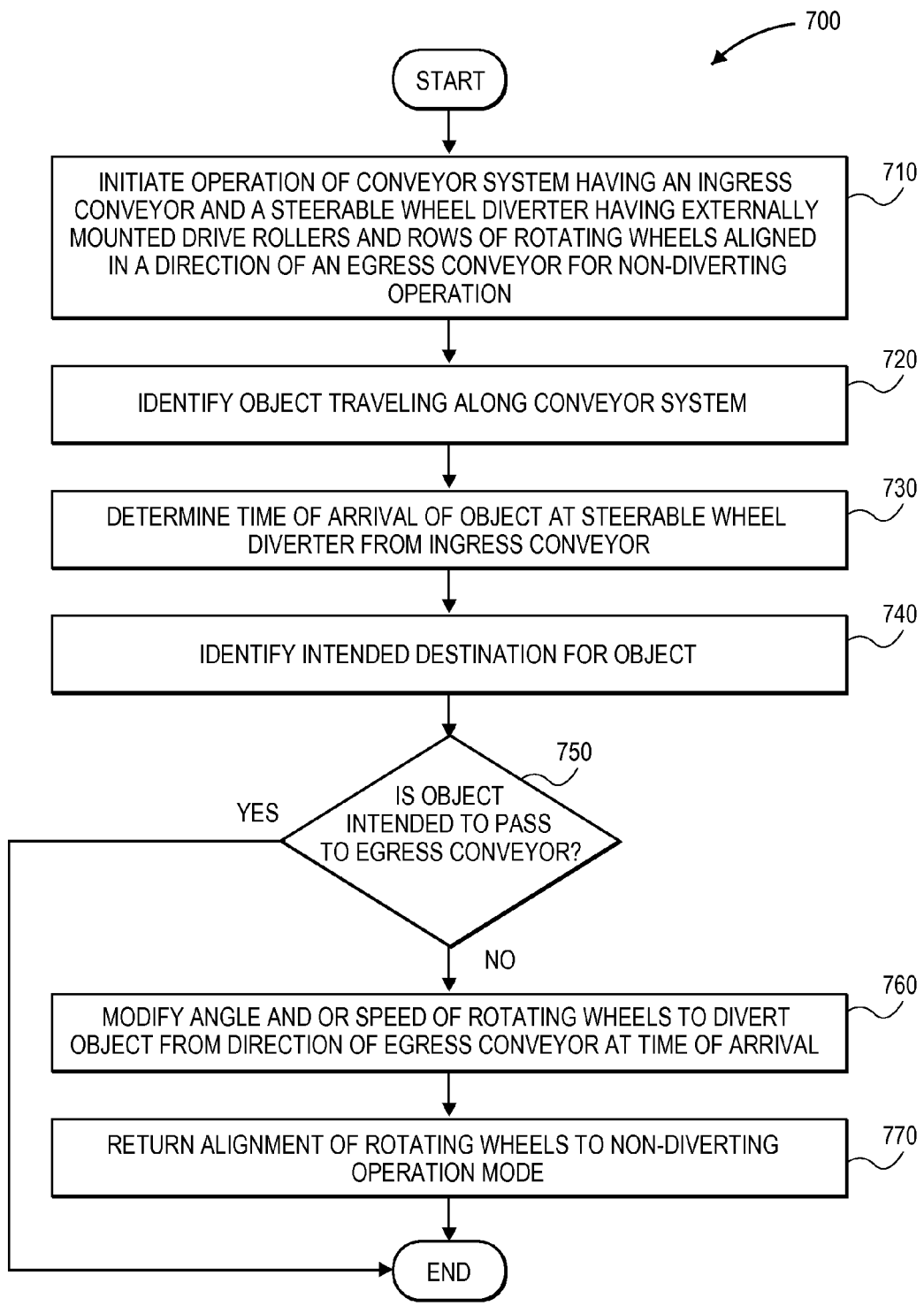
FIG. 7 is a flow chart of one method for conveying objects using a steerable wheel diverter in accordance with embodiments of the present disclosure.

As is discussed above, the systems and methods of the present disclosure are generally directed to steerable wheel diverters having motorized rollers that are mounted outside of a common assembly including one or more non-motorized rollers that are connected to one or more pivotable diverter wheels which may be aligned in rows. Such steerable wheel diverters may be used in connection with any type or form of conveying system, and may receive objects from one or more ingress conveyors, and transfer such objects to one or more egress conveyors or other egress apparatuses, as desired. Referring to FIG. 7, a flow chart 700 representing one embodiment of a process for conveying objects using a steerable wheel diverter is shown.

At box 710, the operation of a conveyor system having an ingress conveyor and a steerable wheel diverter with externally mounted drive rollers and rows of rotating wheels aligned in a direction of an egress conveyor for non-diverting operations is initiated. For example, a conveyor belt aligned upstream of the steerable wheel diverter may be started, and the diverter wheels of the steerable wheel diverter may be caused to rotate at a predetermined angular velocity that will cause any objects received at the steerable wheel diverter to be transferred to an egress conveyor belt or other like device.

At box 720, an object traveling along the conveyor system is identified. For example, the object may be identified by sight, e.g., by a human operator, or by interpreting one or more identifiers associated therewith, e.g., a barcode or other marked identifier, or an RFID tag embedded therein or applied thereto. At box 730, a time of arrival of the object at the steerable wheel diverter from the ingress conveyor is determined. For example, knowing the speed at which the ingress conveyor is operating, a time at which the object will arrive at the steerable wheel diverter may be determined by identifying a location of the object on the ingress conveyor, and dividing a distance from the location to the steerable wheel diverter by the speed of the ingress conveyor.

At box 740, an intended destination for the object is identified. For example, the object may be intended to travel to a storage area associated with a terminus or other element of the egress conveyor when the steerable wheel diverter is aligned for non-diverting operation. Alternatively, it may be desired to divert the object to another egress conveyor, or to an egress apparatus such as a bin, a chute, a cart or a truck. At box 750, whether the object is intended to pass to the egress conveyor is determined. If the object is intended to pass to the egress conveyor, then the process ends, as the steerable wheel diverter is aligned for non-diverting operation.

If the object is not intended to pass to the egress conveyor, e.g., if the object is intended to pass to another egress conveyor or to an egress apparatus not associated with the egress conveyor, then the process advances to box 760, where the angle and/or speed of the rotating wheels are modified to cause the object to be diverted from the direction of the egress conveyor at the time of arrival. For example, where a plurality of objects, including the object identified at box 720, are being transported on the ingress conveyor, a divert control module or like computer device or application may cause the diverter wheels to rotate and be oriented in a non-diverting operation for the objects that are intended to pass to the egress conveyor. Once the object identified at box 720 arrives at the steerable wheel diverter, however, the divert control module or like device or application may transmit one or more signals to the steerable wheel diverter, and cause one or more of the rows of wheels to pivot by a predetermined angular extent, or increase or decrease the angular velocities of the wheels in such rows, as necessary, to cause the object identified at box 720 to be diverted away from the egress conveyor, e.g., toward another egress conveyor, or to an egress apparatus such as a bin, a cart, a chute or a truck. The pivoting may be caused by a force applied to a rack-and-pinion system, such as the linear gear 458 of FIG. 4, which may cause each of the various pinions mounted to the diverter wheels to pivot about a vertical axis by an angle such as thirty degrees (30°), forty-five degrees (45°) or any other applicable angle. At box 770, the alignment of the rotating wheels is returned to the non-diverting operation mode, e.g., with the diverter wheels rotating in a suitable direction and at a suitable angular velocity for causing objects received from the ingress conveyor to be conveyed to the egress conveyor, and the process ends.

Accordingly, the steerable wheel diverters of the present disclosure, which include one or more motorized rollers mounted outside of a common assembly having one or more non-motorized rollers, diverter wheels, actuators or other relevant equipment disposed therein, may be provided in series with an ingress conveyor and an egress conveyor, and utilized in a standard, non-diverting operational mode to cause objects received from the ingress conveyor to be transferred to the egress conveyor. When an object must be diverted from a standard path, e.g., transferred to another egress conveyor, or to an egress apparatus such as a bin, a cart, a chute or a truck, one or more rows of the diverter wheels of the steerable wheel diverter may be temporarily pivoted to cause objects traveling thereon to be diverted away from the standard path.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure. For example, although some of the embodiments described herein or shown in the accompanying figures refer to the use of two motorized rollers provided outside of a common assembly which are connected to two non-motorized rollers within the common assembly, which are further connected to two additional non-motorized rollers within the common assembly, the system and methods of the present disclosure are not so limited, and may be utilized with as few as one motorized roller outside of the common assembly or one non-motorized roller within the common assembly.

Moreover, although some of the embodiments described herein describe specific systems or methods for conveying objects within a fulfillment center environment, the systems and methods of the present disclosure are not so limited, and may be used with any means or method for conveying any form or type of object. Additionally, such means or methods may be used in series or in parallel, and independently or in conjunction with one another, in accordance with the present disclosure.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow chart shown in FIG. 7, the order in which the steps of the methods or processes are listed is not intended to be construed as a limitation on the claimed inventions, and any number of the method or process steps can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Although the invention has been described and illustrated with respect to exemplary embodiments thereof, the foregoing and various other additions and omissions may be made therein and thereto without departing from the spirit and scope of the present disclosure.

What is claimed is:

1. A conveying system comprising:
an ingress conveying apparatus;
a steerable wheel diverter;
a first egress conveying apparatus aligned in a first direction with respect to the steerable wheel diverter; and
a second egress conveying apparatus aligned in a second direction with respect to the steerable wheel diverter,
wherein the steerable wheel diverter comprises:
a common assembly;
at least one row of diverter wheels, wherein each of the diverter wheels of the at least one row is pivotally mounted at least partially within the common assembly;
an actuating system for causing each of the diverter wheels of the at least one row to pivot about an axis of orientation by a predetermined angular extent;
at least one idler roller disposed within the common assembly, wherein the at least one idler roller is rotatably connected to at least one of the wheels of the at least one row; and
at least one drive roller mounted outside of the common assembly, wherein the at least one drive roller is rotatably connected to the at least one idler roller.

2. The conveying system of claim 1, further comprising a divert control module configured to control an operation of the actuating system.

3. The conveying system of claim 1, wherein the predetermined angular extent is defined by a difference between the first direction and the second direction.

4. The conveying system of claim 1, wherein the first egress conveying apparatus is one of a first conveyor belt, a first bin, a first chute, a first cart or a first truck, and
wherein the second egress conveying apparatus is one of a second conveyor belt, a second bin, a second chute, a second cart or a second truck.

5. A diverter system comprising:
a housing;
at least one diverter wheel pivotally mounted at least partially within the housing;
at least one non-powered roller mounted within the housing, wherein the at least one non-powered roller is operatively connected to the at least one diverter wheel; and
at least one powered roller mounted external to the housing, wherein the at least one powered roller is operatively connected to the at least one non-powered roller.

6. The diverter system of claim 5, wherein the at least one powered roller is operatively connected to the at least one non-powered roller by way of at least one band extending between an exterior of the housing and an interior of the housing.

7. The diverter system of claim 5, wherein the housing comprises a mounting assembly, at least one side plate, a cover plate and a base,
wherein the at least one diverter wheel is pivotally mounted to the mounting assembly, and
wherein at least a portion of the at least one diverter wheel extends through a hole in the cover plate.

8. The diverter system of claim 7, wherein the at least one non-powered roller is operatively connected to the at least one diverter wheel by at least one band extending through a band passageway in the mounting assembly.

9. The diverter system of claim 7, wherein the at least one diverter wheel is rotatably supported by a frame having a shaft pivotally mounted to the mounting assembly.

10. The diverter system of claim 5, further comprising a plurality of diverter wheels aligned in at least one row, wherein each of the diverter wheels aligned in the at least one row is pivotally mounted at least partially within the housing, and
wherein each of the plurality of diverter wheels in the at least one row is operatively connected to the at least one non-powered roller within the housing.

11. The diverter system of claim 10, wherein four non-powered rollers are rotatably aligned in parallel within the housing, and
wherein the plurality of diverter wheels are aligned in four rows.

12. The diverter system of claim 11, wherein two powered rollers are rotatably aligned in parallel external to the housing, and
wherein each of the two powered rollers is operatively connected to one of the four non-powered rollers.

13. The diverter system of claim 5, wherein the at least one powered roller comprises an induction motor configured to cause a rotation of the at least one powered roller at a predetermined angular velocity.

14. The diverter system of claim 5, wherein the at least one powered roller is releasably mounted to at least one bracket, and
wherein the at least one bracket is pivotally mounted to the housing.

15. The diverter system of claim 5, further comprising an actuator for causing the at least one diverter wheel to pivot about an axis of orientation from a first direction of rotation to a second direction of rotation.

16. The diverter system of claim 15, wherein the actuator is one of a pneumatic actuator, an electromechanical actuator or a hydraulic actuator.

17. The diverter system of claim 15, wherein the actuator comprises a linear rack in contact with at least one pinion of the at least one diverter wheel.

18. The diverter system of claim 15, further comprising a divert control module in communication with the actuator, wherein the divert control module is configured to control an operation of the actuator.

19. A computer-implemented method for transporting objects comprising:
   aligning a steerable wheel diverter between an ingress conveying apparatus and a plurality of egress conveying apparatuses, wherein the steerable wheel diverter comprises at least one row of diverter wheels pivotally mounted at least partially in a common assembly and at least one motorized roller mounted outside of the common assembly;
   causing, using the at least one motorized roller, each of the diverter wheels in the at least one row to rotate at a first angular velocity;
   determining a first direction of rotation of the at least one row of diverter wheels;
   identifying an object traveling on the ingress conveying apparatus to the steerable wheel diverter using at least one computer processor;
   selecting one of the plurality of egress conveying apparatuses for receiving the object using the at least one computer processor;
   determining whether the first direction of rotation is aligned with the selected egress conveying apparatus;
   upon determining that the first direction of rotation is not aligned with the selected egress conveying apparatus,
      identifying a second direction of rotation, wherein the second direction of rotation is aligned with the selected egress conveying apparatus; and
      causing each of the diverter wheels in the at least one row to pivot about an axis of orientation by a first predetermined angle in a first angular direction, wherein the first predetermined angle is defined by a difference between the first direction of rotation and the second direction of rotation.

20. The computer-implemented method of claim 19, further comprising:
   causing each of the diverter wheels in the at least one row to pivot about the axis of orientation by the first predetermined angle in a second angular direction.

* * * * *